United States Patent [19]
Leiber

[11] 3,909,070
[45] Sept. 30, 1975

[54] ANTI-LOCKING CONTROL SYSTEM

[75] Inventor: Heinz Leiber, Leimen, Germany

[73] Assignee: Teldix GmbH, Heidelberg, Germany

[22] Filed: Aug. 28, 1973

[21] Appl. No.: 392,173

[30] Foreign Application Priority Data
Sept. 2, 1972  Germany............................ 2243260

[52] U.S. Cl............... 303/21 P; 188/181 C; 303/20
[51] Int. Cl.².......................................... B60T 8/10
[58] Field of Search ............... 188/181; 303/20, 21; 307/10 R; 317/5; 324/161–162; 340/53, 62, 262, 263

[56] References Cited
UNITED STATES PATENTS

| | | | |
|---|---|---|---|
| 3,578,819 | 5/1971 | Atkins............................ | 303/21 BE |
| 3,701,569 | 10/1972 | Arai et al....................... | 303/21 BE |
| 3,754,797 | 8/1973 | Rodi et al....................... | 303/21 BE |
| 3,790,227 | 2/1974 | Dozier............................ | 303/21 BE |
| 3,794,389 | 2/1974 | Davis et al..................... | 303/21 P |
| 3,797,892 | 3/1974 | Leiber............................ | 303/21 EB |

Primary Examiner—Trygve M. Blix
Assistant Examiner—Stephen G. Kunin
Attorney, Agent, or Firm—Spencer & Kaye

[57] ABSTRACT

An anti-locking control system for the common control of brake pressure at the wheel brakes of a plurality of wheels of a vehicle comprises apparatus for sensing a tendency to lock on the part of the wheels, first switching apparatus responsive to the sensing apparatus for producing an output related to locking tendencies of the wheels and switchable to a "select low" or a "select high" stage, and second switching apparatus operable to switch the first switching apparatus from the "select low" to the "select high" stage on the appearance of an output from the first switching apparatus in the "select low" stage.

25 Claims, 5 Drawing Figures

3,909,070

ANTI-LOCKING CONTROL SYSTEM

BACKGROUND OF THE INVENTION

The invention relates to an anti-locking control system for the control of the brake pressure at a plurality of wheels of a vehicle in common. Preferably the wheels of one axle of the vehicle have a common control.

Such an anti-locking control system is known from the U.S. Pat. No. 3,535,004. In the normal operation of this system (in the "select low" condition), a voltage corresponding to the speed of the more slowly rotating vehicle wheel is fed to the control channel. A switch-over to "select high" control, i.e. the feed to the control channel of the voltage corresponding to the speed of the more rapidly rotating wheel is effected, if and as long as the wheels rotate with substantially differing speeds. This occurs where the wheels are in contact with a surface which has widely varying coefficients of friction. In the case of such a surface, in the case of a "select-low" control, one wheel would contribute relatively little to the braking. The known arrangement is based on the problem of economising on control channels in order to make the anti-locking control systems cheaper thereby.

I have previously suggested in that, in the case of the common control of the braking pressure, control should be switched over from the normally operative control type "select-high" to the control type "select-low" if transverse accelerations occur or are to be expected; here disadvantages of the "select-high" type of control should be eliminated when braking on curves.

SUMMARY OF THE INVENTION

It is an object of the invention to provide a simple and effective concept for the common control of the brake pressure at the wheels of one axle, which can guarantee a high stability also on curves and can permit a large curve limit speed.

According to a first aspect of the invention there is provided an anti-locking control system for the common control of the brake pressure at the wheel brakes of a plurality of wheels of a vehicle comprising sensing means for sensing a tendency to lock on the part of the wheels, first switching means responsive to said sensing means for producing, in a first switching state ("select low"), a signal if at least one wheel shows a tendency to lock and for producing in a second switching state ("select high") a signal if all wheels show a tendency to lock and second switching means responsive to a signal from said first switching means for switching over said first switching means from said "select low" switching state to said "select high" switching state for a predetermined period if said first switching means is in its "select low" state.

According to a second aspect of the invention, there is provided an anti-locking control system for the common control of the brake pressure at the wheel brakes of a plurality of wheels of a vehicle comprising wheel speed sensors for sensing the wheel speeds of each wheel and producing an output value related thereto, means for producing a mean value from the output of said wheel speed sensors, means for generating a reference value approximating to the speed of the vehicle, a comparator having first and second stages for comparison between the said mean value and a first portion of said reference signal ("select low") or a second portion smaller than half of said reference signal ("select high") and switching means for switching over said comparator between said first and second stages on output from said comparator in said first stage.

BRIEF DESCRIPTION OF THE DRAWINGS

The invention will now be described in greater detail, by way of example, with reference to the drawings, in which.

DESCRIPTION OF THE PREFERRED EMBODIMENTS

Figure 1:
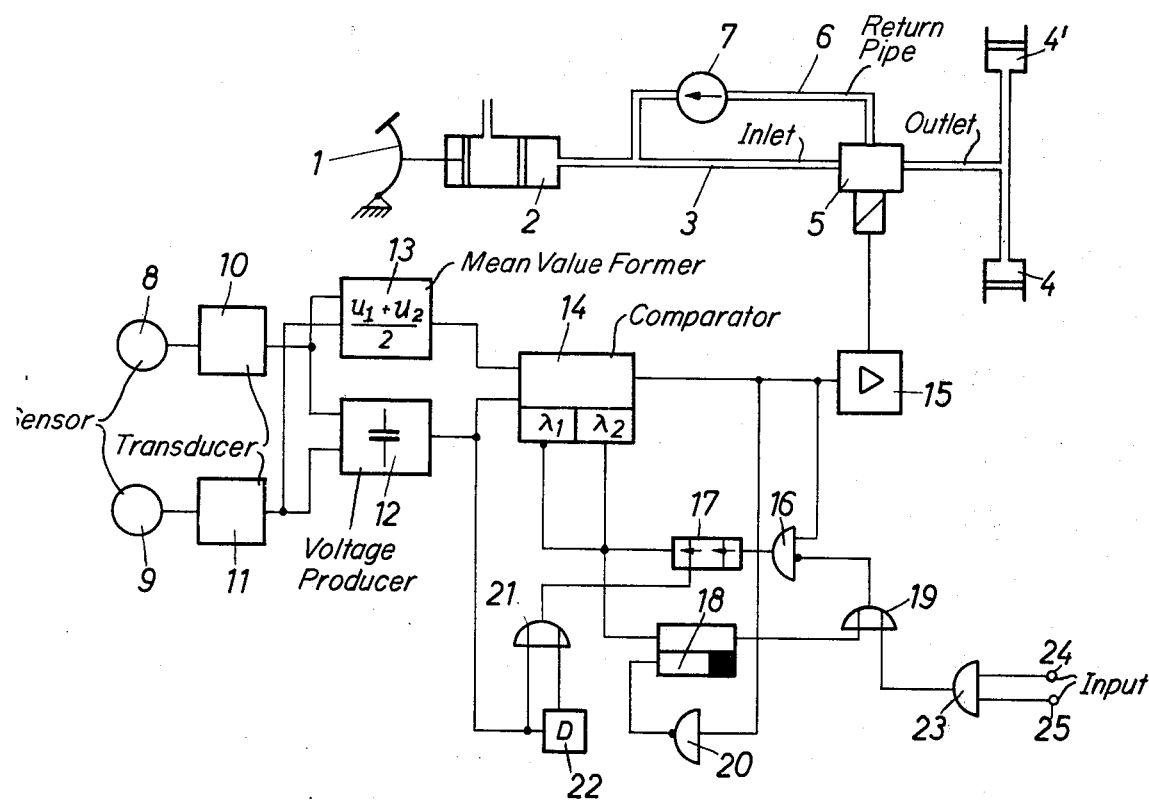
FIG. 1 shows one embodiment of the invention.

Basically the invention is particularly suitable for the rear axle of vehicles, such as passenger vehicles, lorries and trailers. It is of particular interest for the brake control of semi-trailers or articulated vehicles, on account of the transverse forces originating in the trailer. For the invention, it is unimportant, whether the control signals are produced by means of equipment operating in an analogue or a digital fashion.

It is favourable not to undertake the switch-over to "select-high" immediately on the occurence of the control signal but after a short delay (e.g. 20 msec). It is also of advantage to make the time, during which the system remains switched over to "select high," dependent on the vehicle speed and/or the vehicle deceleration, that is to say in such a manner that the time increases as the vehicle speed or vehicle deceleration becomes smaller. Furthermore, it is advantageous to prevent the switch-over "select-high," if the vehicle deceleration falls below a certain value and the steering wheel is turned or in the case of a semi-trailer when the trailer is bent at a certain angle with respect to the towing machine or mechanical horse.

The solution in accordance with the invention may be realised in an advantageous manner by a comparator with a compartor value which can be switched between a first stage ("select low") and a second stage ("select high"). The comparator is, on the one hand, fed in a manner known per se, with a reference signal approximating the vehicle speed and, on the other hand, with the arithmetic mean of the signals corresponding to the two wheel speeds. In the case of the "select-low" control the mean value is compared to a substantial portion of the signal approximating the vehicle speed, such as, e.g. 95%; this means that the comparator emits a control signal, if, e.g. one of the wheel signals is 10% smaller than the reference signal. In the case of the "select-high" control, a portion, which is smaller than half of the reference signal, serves as comparison value, e.g. 45% of the reference signal. If a wheel locks then a control signal appears if the rotary speed of the other wheel deviates from the desired value again by more than 10%. The switch-over from the large to the small comparison value is effected preferably by the output signal of the comparator itself. This output signal may be fed to a timing element which lengthens the input signal to a predetermined time. In order to prevent a further new setting up of the timing element, a gate may be connected upstream of the timing element, which is blocked from the time of occurrence of an output signal from the timing element. For this, a bistable element can be used, which is set by the output signal of the timing element and then blocks the gate. This bistable element is reset by the first disappearance of the output signal of the comparator which occurs after the end of the output signal of the timing element.

In order to make the time in which the select-high control is operative controllable, the timing element may be constructed to be controlled in a favourable manner. In order to prevent the switch-over to "select-high" when a turn is made of the steering wheel or a certain kink angle occurs with a semi-trailer together with a low vehicle deceleration, a gate can be provided to block the switchover control line.

Referring to FIG. 1 of the drawings, a tandem brake master cylinder 2 of a vehicle is actuated by means of the brake pedal 1. Here, however, only the brake circuit leading to the rear wheels, with the brake line 3 and the two brake cylinders 4 and 4' is shown. An inlet/outlet valve 5 for the brake pressure control is connected in the brake line. The brake fluid let out during the control is pumped back into the system through a return pipe 6 by a pump 7.

8 and 9 indicate the two sensors associated with the rear wheels (not shown), 10 and 11 indicate two transducers for producing direct voltages dependent on the rotary speed from the sensor outputs. In an element 12, there is produced, from the outputs of both transducers and in a manner known per se, a voltage approximating the course of the vehicle speed. This voltage is, in practice, obtained mostly from the front wheels (not shown) and is concomitantly used for rear wheel control. The mean value of the two direct voltages $v_1 + v_2/2$ is formed in the element 13. The output voltages of the two elements 12 and 13 are fed to a comparator 14, which can be switched between two comparison stages. In the case of the stage λ1 normally operative, the mean speed value voltage determined is compared with, for example, 95% of the reference voltage and in the case of the stage λ2, for example, with 45% of the reference voltage.

When the mean speed values in the individual stages fall below the predetermined thresholds, an output signal is obtained from the comparator, which signal actuates the valve 5 through the amplifier 15. The output signal of the comparator occuring in the case of incipient control, that is to say when the voltage falls below the 95% threshold for the first time, passes through the gate 16 to the timing element 17. This timing element 17 delays the incoming signal by a specified time value of, for example, 20 msec and emits an output signal of specified length (e.g. 100 msec). This output signal switches over the comparator to the λ2 stage, which in effect is the same as a switch-over to "select-high." Simultaneously the output signal of the timing element 17 triggers a bistable element 18 into a position in which it blocks the gate 16 through its negated input by means of the OR gate 19. Thus the timing element can no longer be reset, and the specified time for the "select-high" control expires. The bistable element 18 is, after termination of the output signal of the timing element, reset by the disappearance of the output signal of the comparator element (on account of the negator element 20), so that a subsequent output signal of the comparator 14 can again initiate the "select-high" control.

Figure 2:
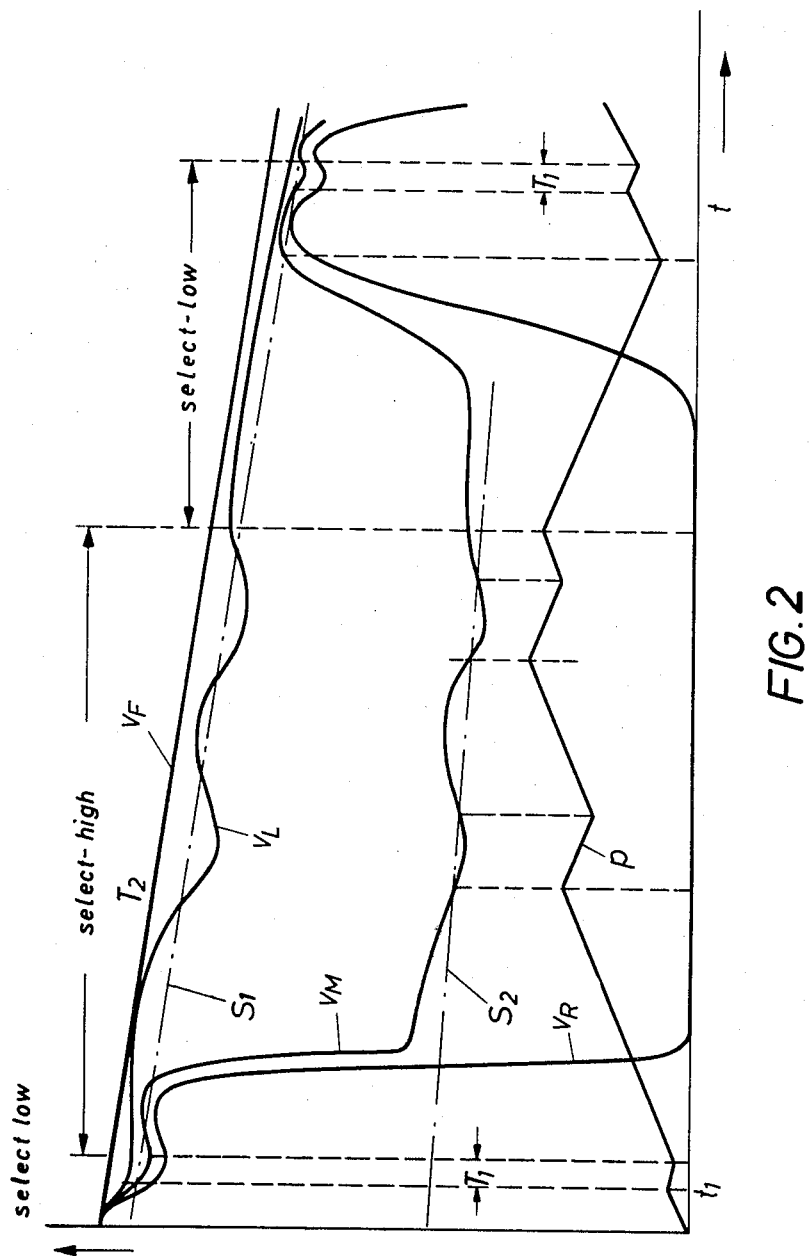
FIG. 2 contains diagrams for clarifying the operation of the invention.

The operation of the invention will now be explained with reference to the diagrams of FIG. 2:

In FIG. 2 of the drawing in which a road surface with differing $\mu$ is presupposed, different curves are plotted against time. $v_F$ is the vehicle speed of a braked vehicle, $v_R$ and $v_L$ are the two wheel speeds of its rear wheels, $v_M$ is the mean wheel speed, $S_1$ and $S_2$ are the two thresholds (95 % and 45 % of the vehicle speed) and P is the brake pressure.

It can be seen from FIG. 2 that the two wheel speeds $v_R$ and $v_L$ will, with increasing brake pressure P, diverge from the vehicle speed, that is to say exhibit slip. At $t_1$ the mean wheel speed $v_M$ falls below the threshold $S_1$. After the delay time $T_1$ incurred by the timing element 17, in which time the brake pressure is reduced, the system is then switched over to "select-high," i.e. the threshold $S_2$ becomes operative. The brake pressure P increases again until $v_M$ falls below the threshold $S_2$. In this situation, the right-hand wheel has already locked and the speed of the left-hand wheel is controlled until after a time $T_2$, the system is switched back to "select-low" again. With this threshold $S_1$ is again operative, the brake pressure is reduced (up to the point where $v_M$ passes the threshold $S_1$) and the wheel speed $v_R$ again increases. The process described is repeated, as soon as $v_M$ falls below the threshold $S_1$ again.

As already mentioned, the time during which the "select-high" control is operative, can be further extended (e.g. between 200 msec and 1 sec). This is provided for in FIG. 1 by a feed-in of the reference voltage to the timing element 17 (by means of the OR gate 21), which reference voltage is a measure of the vehicle speed. With increasing vehicle speed and thus increasing reference voltage, the time span in which "select-high" is operative, is reduced. Also, further vehicle deceleration can be achieved from the reference voltage by means of a discriminator 22, which deceleration also serves to control the time constants of the element 17.

The switch-over to "select-high" control can be prevented by means of the AND gate 23, if, because of a low vehicle deceleration, a signal appears at the terminal 24 and if, because of a steering wheel turn or an angle of bend in the case of semi-trailers, a signal appears at terminal 25.

The alternating control in accordance with the invention is particularly intended for the control of the wheel brakes of the rear wheels of a vehicle.

Further improvements and embodiments of the system will be described with reference to FIGS. 3–5.

Figure 3:
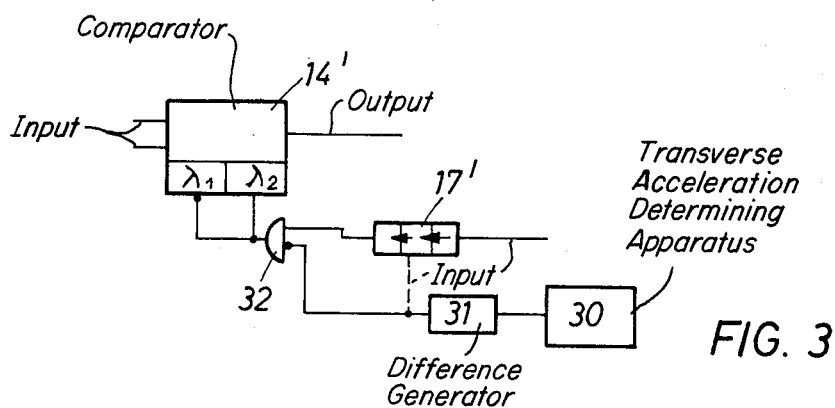
FIG. 3 shows a modified form of the arrangement of FIG. 1.

For increasing the side guide force in the case of a swerving of the vehicle controlled in accordance with the invention, the arrangement of FIG. 3 which is a modification of the arrangement of FIG. 1 is a possibility. In FIG. 3, an apparatus 30 for determining the force causing transverse acceleration is provided. This apparatus 30 emits a signal, dependent on the transverse acceleration, to a difference generator 31, which, in the case of a specified change in the transverse acceleration, such as occurs in the case of a swerving of the vehicle, produces a signal, thus blocking the gate 32 to cut off the output signal of the timing element 17'. As a result, the switch-over of the comparator 14' to λ2 and thus the switch-over to "select-high" is prevented or interrupted. Instead of causing this interruption, the time period of the "select high" control can be shortened. For this purpose, the output signal of the element 31 is fed to the timing element 17' by means of the line, (shown dotted for time constant switch-over).

In order to avoid too high a wear at the locked wheel, in the case of there being a different frictional value at the wheels on different sides of the vehicle, in the case of "select-high" operation, this differing frictional value is determined in accordance with a further form of the invention. Also the time $T_2$, in which the "select-high" operation is operative, is shortened, whereby the delay-time $T_1$ is also shortened in a sensible manner. For this purpose FIG. 4 shows an embodiment, in which the difference of the controlled pressures at the front wheels is measured to determine the frictional value difference. Pressure meters 40 and 41 and a difference generator 42, which produces a signal, if a certain pressure difference occurs, serve for this purpose. This signal is fed to the timing element 17'', which corresponds to the timing element 17 of FIG. 1, to switch-over one or both time constants of the timing element.

Then, if a different frictional value occurs at the wheels of different vehicle sides, a pressure value lying between the -in this case- very different brake pressures of "select-high" and "select-low," is produced at the wheels of the rear axle for a certain time; in this case the control must be interrupted. An example of this is shown in FIG. 5 where a gate 50 is connected between the output of the comparator 14'', corresponding to the comparator 14 of FIG. 1, and the valve 5'. The gate 50 is normally open, but is blocked by means of the AND gate 57, for example, with the occurence of an output signal from the difference element 42 of FIG. 4, which element 42 is connected to terminal 56, and, with the occurence of the "select-high" signal, and thus interrupts the control. In this embodiment the different pressures involved in "select-low" and "select-high" operations are measured by means of the pressure meter 52 and a comparison signal is formed in the element 53, from the signals obtained, e.g. by averaging. This comparison signal is compared with the then instantaneous pressure value; with a deviation a control signal is formed which controlled the valve arrangement by means of gate 54 and OR gate 55.

Figure 4:
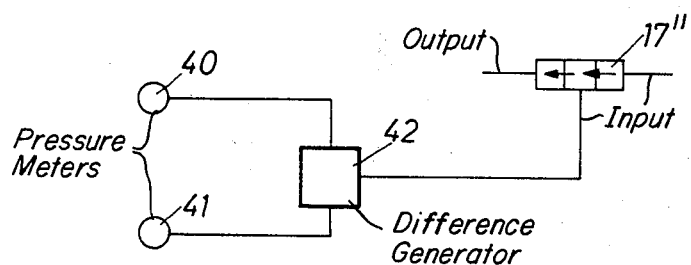
FIG. 4 shows a further modified form of the arrangement of FIG. 1.
Figure 5:
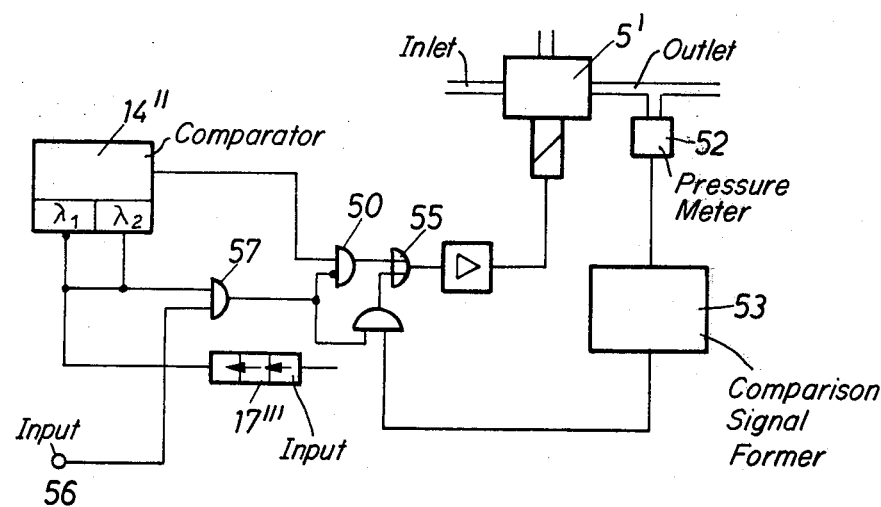
FIG. 5 shows a still further modified form of the arrangement of FIG. 1.

Instead of the measurement of the differing brake pressures, measurement of the different response times of the front wheel valves or the rear wheel valves in the case of both of the different control types, could be used to determine the pressure difference and initiate switch-over according to FIGS. 4 or 5.

It will be understood that the above description of the present invention is susceptable to various modification changes and adaptations.

What is claimed is:

1. In a wheeled vehicle having a wheel braking system with wheel brakes associated with the respective wheels, an anti-locking control system for the common control of the brake pressure at the wheel brakes of a plurality of said wheels of said vehicle comprising: sensing means for sensing a tendency to lock on the part of the wheels; first switching means responsive to said sensing means for producing, in a first switching state ("select low"), a signal if at least one wheel shows a tendency to lock and for producing in a second switching state ("select-high") a signal if all wheels show a tendency to lock; and second switching means responsive to an output signal from said first switching means for, after a predetermined time period, switching over said first switching means from said "select low" switching state to said "select high" switching state for a second predetermined time period if said first switching means is in its "select low" state.

2. A system as defined in claim 1, and comprising means for causing switch over of said first switching means from its "select low" state to its "select high" state after 20 m sec.

3. A system as defined in claim 1 and comprising means for varying said time period during which said first switching means is in its "select high" state in dependence on the vehicle speed whereby said second time period increases with decreasing vehicle speed.

4. A system as defined in claim 1 and comprising means for varying said time period during which said first switching means is in its "select high" state in dependence on the vehicle deceleration whereby said second time period increases with decreasing vehicle deceleration.

5. A system as defined in claim 1 and comprising means for preventing switch over of said first switching means to the "select high" state if the vehicle deceleration falls below a predetermined value and the steering wheel of said vehicle is turned to a predetermined extent.

6. A system as defined in claim 1 and comprising means for preventing switch over of said first switching means to the "select high" state if the vehicle deceleration falls below a predetermined value and a predetermined kink angle occurs between trailer and mechanical horse.

7. A system as defined in claim 1 wherein: said sensing means includes wheel speed sensors for sensing the wheel speeds of each wheel and producing an output signal having a value related thereto, means for producing a signal having a mean value from the output signals of said wheel speed sensors, and means for generating a reference value signal approximating the speed of the vehicle; said first switching means includes a comparator having first and second stages for comparison between the said mean value signal and a first portion of said reference signal ("select low") or a second portion smaller than half of said reference signal ("select high"); and said second switching means switches said comparator between said first and second stages on receipt of an output signal from said comparator in said first stage.

8. A system as defined in claim 7, wherein said second switching means includes a timing element to which said output signal from said comparator is applied and by which the length of time of switch over of said comparator to "select high" is determined.

9. A system as defined in claim 8, and comprising a gate located prior to said timing element for blocking an input to said timing element on the appearance of an output signal from said timing element.

10. A system as defined in claim 9 and comprising a bistable element which is set by said output signal of said timing element to block said gate and reset, after the termination of said output signal from said timing element, when said output signal of said comparator terminates.

11. A system as defined in claim 8, wherein said timing element comprises an element whose timing is controllable by a control voltage.

12. A system as defined in claim 11, wherein said control voltage comprises a voltage dependent on the speed of said vehicle.

13. A system as defined in claim 11, wherein said control voltage comprises a voltage dependent on the deceleration of said vehicle.

14. A system as defined in claim 11, wherein said control voltage comprises a voltage dependent on the speed of said vehicle and on the deceleration of said vehicle.

15. A system as defined in claim 8 and comprising means for preventing switching over of said switching means from said "select low" state to said "select high" state if the vehicle deceleration falls below a predetermined value and the steering wheel of said vehicle is turned to a predetermined extent.

16. A system as defined in claim 8 and comprising means for preventing switching over of said switching means from said "select low" state to said "select high" state if the vehicle deceleration falls below a predetermined value and a predetermined kink angle occurs between trailer and mechanical horse.

17. A system as defined in claim 7 and comprising a measuring device for measuring transverse accelerations of said vehicle and means responsive to sudden changes in the transverse acceleration measured by said measuring device for shortening the time said comparator is in the "select high" state.

18. A system as defined in claim 7 and comprising a measuring device for measuring transverse accelerations of said vehicle and means responsive to sudden changes in the transverse acceleration measured by said measuring device for preventing switch over of said comparator from the "select low" into the "select high" state.

19. A system as defined in claim 7 and comprising means for determining different frictional values at wheels on opposite sides of said vehicle and means responsive to said determining means for shortening the time said comparator is in the "select high" said state on the occurrence of a predetermined difference in said frictional values.

20. A system as defined in claim 19 and comprising means responsive to said determining means for shortening the time prior to switch over of said comparator to the "select high" state on the occurrence of a predetermined difference in said frictional values.

21. A system as defined in claim 7 and comprising means for determining different frictional values at wheels on opposite sides of said vehicle and means responsive to said determining means for providing said wheel brakes with a pressure between that associated with "select low" operation and that associated with "select high" operation for a predetermined time on the occurrence of a predetermined difference in said frictional values.

22. A system as defined in claim 21, wherein said responsive means is actuated for at least the time of a "select high" operation.

23. A system as defined in claim 7 and comprising means for determining different frictional values at wheels on opposite sides of said vehicle and means responsive thereto for providing a control signal.

24. A system as defined in claim 23 wherein said determining means comprises means for measuring the controlled brake pressure at the front wheels of said vehicle.

25. A system as defined in claim 23, wherein said determining means comprises means for measuring the response times of control valves for controlling the brake pressures, the said valve response time representing a measure of the brake pressure value during their control.

* * * * *